United States Patent
Cretnik et al.

(10) Patent No.: US 11,318,443 B2
(45) Date of Patent: May 3, 2022

(54) PROCESS FOR THERMALLY DESORBING A PHASE MATERIAL

(71) Applicant: CTC Analytics AG, Zwingen (CH)

(72) Inventors: Stefan Anton Cretnik, Dornach (CH); Beat Schilling, Zürich (CH); Chiew Mei Chong, Singapore (SG)

(73) Assignee: CTC ANALYTICS AG, Zwingen (CH)

( * ) Notice: Subject to any disclaimer, the term of this patent is extended or adjusted under 35 U.S.C. 154(b) by 329 days.

(21) Appl. No.: 16/577,995

(22) Filed: Sep. 20, 2019

(65) Prior Publication Data

US 2020/0094222 A1  Mar. 26, 2020

(30) Foreign Application Priority Data

Sep. 21, 2018 (EP) .................................. 18196060

(51) Int. Cl.
| | |
|---|---|
| *B01J 20/34* | (2006.01) |
| *B01J 20/26* | (2006.01) |
| *B01J 20/28* | (2006.01) |
| *B01J 20/281* | (2006.01) |

(52) U.S. Cl.
CPC ......... *B01J 20/3483* (2013.01); *B01J 20/261* (2013.01); *B01J 20/262* (2013.01); *B01J 20/281* (2013.01); *B01J 20/28023* (2013.01)

(58) Field of Classification Search
CPC ...... B01J 20/34; B01J 20/3483; B01J 20/261; B01J 20/262; B01J 20/28023; B01J 20/281
USPC ........................................................ 502/56
See application file for complete search history.

(56) References Cited

U.S. PATENT DOCUMENTS

| | | |
|---|---|---|
| 7,047,661 B2 | 5/2006 | Alcaraz et al. |
| 9,212,979 B2 | 12/2015 | Chanbasha et al. |

FOREIGN PATENT DOCUMENTS

| | | |
|---|---|---|
| GB | 2 392 114 A | 2/2004 |
| WO | WO 00/17429 A1 | 3/2000 |

*Primary Examiner* — Edward M Johnson
(74) *Attorney, Agent, or Firm* — Birch, Stewart, Kolasch & Birch, LLP

(57) ABSTRACT

In a process for thermally desorbing a phase material (20), in particular for conditioning a fiber for carrying out a solid-phase microextraction, the phase material (20) is heated along a temperature curve. The temperature curve of the phase material (20) during desorption includes at least one low point.

17 Claims, 3 Drawing Sheets

PROCESS FOR THERMALLY DESORBING A PHASE MATERIAL

TECHNICAL FIELD

The invention relates to a process for thermally desorbing a phase material, in particular for conditioning a fiber for carrying out a solid-phase microextraction, wherein the adsorbent is heated along a temperature curve. The invention further relates to an associated device.

PRIOR ART

Chemical analyses often use adsorbents that adsorb the substance under investigation. Such adsorbents are used, for example, in solid-phase extraction (SPE) and in solid-phase microextraction (SPME), but also in chromatography columns, for example in HPLC (high-performance liquid chromatography) or GC (gas chromatography).

In SPME or SPE, the adsorbent adsorbs an analyte from a gas phase or a liquid phase. The analyte is subsequently liberated—usually thermally—for analysis. This is done, for example, in an injection port of an HPLC or GC.

The phase material or adsorbent takes the form, in SPME for example, of phase material of a fiber, a solid phase of a chromatography column or other solid phase for analyte enrichment, filtration or chromatography. The phase material preferably comprises (but is not limited to) polyacrylate, Carbowax, polydivinylbenzene, Carboxen, PDMS, polydimethylsiloxane or mixtures or derivatives thereof, in particular known materials for separation columns from the field of chromatography, in particular from the field of gas or liquid chromatography (GC, LC).

When employed, SPME is exposed to an analyte, resulting in adsorption of the latter by the phase material of the fiber. The fiber then undergoes desorption in an injection port of an analyzer. The fiber is then conditioned for further use, that is to say, the analyte remaining in the phase material of the fiber is completely desorbed to restore the fiber to a usable state.

The time needed for complete desorption of the analyte from the phase material depends inter alia on the analyte, the layer thickness of the phase material, and the desorption temperature.

Various techniques for conditioning the phase material/fiber are known.

U.S. Pat. No. 9,212,979 B2 (King Fand University of Petroleum and Minerals) discloses an automated headspace SPME process that is coupled to a gas chromatograph-mass spectrometer. For this purpose, the SPME fiber is introduced into an injection port of a gas chromatograph. After desorption, the SPME fiber is cleaned by heating the injection port for 2-10 minutes at a temperature between 200-350° C., preferably for 5 minutes at a temperature of 250° C. U.S. Pat. No. 7,047,661 B2 (The Regents of the University of California) discloses a device and process for cleaning and conditioning an SPME fiber without the use of a gas chromatograph, as these are problematic in respect of carryover and cross-contamination. The device comprises an elongated chamber having a first end for admitting the SPME fiber and an opposite end having a fluid outlet, and also a heating unit and a means for permitting a fluid to flow through the chamber from the first end to the second. The design of the conditioning device as a separate unit has the advantage that different temperatures compared to the injector of the analyzer may be selected.

The SPME Fiber Conditioning Module marketed by CTC Analytics AG is operated at a temperature between 200° C. and 340° C., depending on the layer thickness of the stationary phase on the fiber. The fiber is conditioned in the module for about 30 minutes at this temperature.

The known techniques for conditioning a fiber for SPME have the disadvantage that the fiber becomes unusable relatively swiftly. Thus, the strong heating employed has been found to cause the fiber to become brittle and vitrified, which means that, depending on the layer thickness of the phase material and diameter of the fiber, the fiber will already no longer be usable after relatively few uses, for example 30-35 uses, and conditioning at 280° C. for 20 minutes each time, due to the adsorption properties being too severely compromised.

DESCRIPTION OF THE INVENTION

It is an object of the invention to provide a process belonging to the technical field mentioned at the start for conditioning phase material, in particular a fiber for SPME, that can increase the lifetime of the phase material, in particular of the fiber, compared to the known processes.

The achievement of the object is defined by the features of claim 1. According to the invention, the temperature curve of the phase material during desorption includes at least one low point.

The fact that the temperature curve of the phase material during desorption includes at least one low point means that the conditioning process is gentle on the phase material. The transitory fall in temperature to the low point of the temperature curve significantly reduces the aging process and the vitrification and brittleness of the phase material. This maybe due inter alia to the phase material needing to be held above a critical temperature for a certain period in order for vitrification to occur, since vitrification occurs relatively slowly on account of the high viscosity. If this period is interrupted or shortened, the degree of vitrification that occurs is accordingly minimal or much lower.

Moreover, the fact that conditioning can be carried out more efficiently means that the maximum temperature may be set to a lower value than in conventional processes, thereby allowing the fiber, in particular the phase material, to be conditioned more gently. This allows the lifetime of the fiber to be increased further.

On the other hand, the low points in the desorption temperature curve have been shown to have virtually no adverse effect on the efficiency of the process. Depending on the type of phase material and on the analyte and conditioning temperature, it has been shown that the total duration of conditioning may even be reduced without having to accept losses in conditioning quality. This means that the present process allows carryover of analytes to be kept very low while shortening the total duration.

Experiments have shown that the lifetime of the phase material/fiber may be up to five times longer with this gentle process. Accordingly, a fiber that can be used only for about 30 cycles at conditioning conditions of 280° C. for 20 minutes can now be used for up to 150 cycles.

Unless otherwise stated, the stated temperatures in each case refer to a temperature in the chamber in which the phase material/fiber is used for conditioning.

The phase material preferably comprises a sorbate that is able to sorb a sorbent in the sense of common sorption isotherms (for example according to Zeldowitsch, Freundlich, Langmuir or BET models). The phase material preferably comprises a fiber, in particular a fiber for SPME.

However, the phase material may also comprise a chromatography column or similar. The fiber is preferably retractable into a cannula and extendable so that the fiber may be protected when not in use. The cannula for this purpose has an inner diameter that is slightly larger than the outer diameter of the fiber. The diameter of a fiber including the phase material may, for example, be between 0.1 mm and 10 mm. In preferred embodiments, the fiber has an outer diameter of 0.2 mm to 1.2 mm and the cannula accordingly has an outer diameter of about 0.6 mm to 1.6 mm. In further preferred embodiments, the fiber has a diameter of more than 1.6 mm, wherein the cannula may be dispensed with, particularly at larger fiber diameters.

However, it will be clear to those skilled in the art that the fiber and/or cannula may also have other dimensions. The fiber may have a surface area of approximately 5 mm$^2$ to 100 mm$^2$ in the region of the phase material. The chosen surface area may also be smaller or larger. The cannula can generally also be dispensed with.

The phase material, in particular the fiber, does not necessarily need to be circular-cylindrical, but may also be polygonal or another shape in cross section. The cross section may, for example, be triangular, oval, rectangular, hexagonal, etc. Polygons do not need to be regular, for example triangles may contain a right angle or hexagons may have two longer, parallel sides. In an embodiment with a rectangular cross section, the ratio of the sides may generally take any value, in particular the phase material, for example the fiber, may even be plate-shaped, in particular designed as a so-called coated SPME blade. The phase material, in particular the fiber, may be designed for use in a gas chromatograph, a liquid chromatograph or other analyzers.

The term desorption is understood as meaning the escape of the analyte from the phase material. The phase material/adsorbent is present in the fiber in the form of a coating. This may have different layer thicknesses, for example between 1 and 500 micrometers, preferably between 7 and 250 micrometers. Experiments have shown that the desorption process is especially preferable over conventional processes for larger layer thicknesses. The phase material preferably comprises one or more of the following substances: polyacrylate, Carbowax, polydivinylbenzene, Carboxen, PDMS, polydimethylsiloxane, silica gel, activated carbon or nanoporous materials.

The term conditioning is understood as meaning a process in which the phase material, in particular the fiber, is cleaned for reuse. In this process, residues of the analyte and any other substances present, such as solvents and similar, are desorbed by heating the phase material.

The term temperature curve is understood as meaning a profile of the temperature prevailing in the conditioning space during the conditioning process. The temperature curve is hereinafter visualized as a plane curve in which the X axis/abscissa is the time and the Y-axis/ordinate is the temperature. The low point here represents a local minimum on the temperature curve.

In the preferred embodiment, the process concerns the conditioning of a fiber for the execution of solid-phase microextraction (SPME). However, it will be clear to those skilled in the art that the conditioning process may be used for other thermal conditioning methods too, in particular HPLC or GC columns could also be conditioned using the same technique.

It is preferable if a temperature difference between a maximum temperature of the temperature curve and the low point of the temperature curve is between 50° C. and 500° C., preferably between 100° C. and 400° C., especially preferably between 150° C. and 350° C. The temperature difference is preferably chosen such that the heating phase that follows the low point does not stress the phase material excessively, but is able merely to desorb the analyte/the phase material-adsorbed substances.

In variants, the temperature difference may also be smaller than 50° C. or larger than 500° C.

It is preferable if the maximum temperature is between 100° C. and 600° C., preferably between 150° C. and 400° C., especially preferably between 200° C. and 300° C. It is particularly preferable if the maximum temperature is between 250° C. and 300° C., in particular about 280° C. Experiments have shown that this temperature is preferable for gentle, but efficient conditioning, especially when conditioning fiber for SPME. As a general principle, the conditioning of the phase material, particularly the fiber, is gentler at lower temperatures.

In variants, the maximum temperature may also be below 100° C. or above 600° C.

It is preferable if the low point is between 0° C. and 300° C., preferably between 10° C. and 150° C., especially preferably between 15° C. and 50° C. In a preferred embodiment, the low point is about room temperature, i.e. about 18° C. to 28° C. Especially in the absence of active cooling it is possible to achieve an efficient process with a choice of low point clearly above room temperature.

In variants, the low point may also be below 0° C., particularly if active cooling is provided.

It is preferable if the temperature curve includes more than one low point, in particular between 2 and 10 low points, preferably between 4 and 8 low points. The multiplicity of low points can increase the efficiency of the conditioning process and thus reduce analyte carryover in subsequent analyses. The greater the number of low points, the more efficiently the conditioning process is able to be carried out.

In variants, a single low point may also be sufficient, depending in particular on the requirements of the fiber and the measurements.

It is preferable if, between two low points, a high point is in each case reached that is greater than 0.8 times, preferably greater than 0.9 times the maximum temperature. It is particularly preferable if, between two low points, a high point with essentially the maximum temperature is in each case reached.

In variants, the temperature curve between two low points may also have a local maximum that is less than 0.8 times the maximum temperature. For example, consecutive local maxima may increase continuously or have different behaviors. For example, a fluid may be provided that continuously flushes the chamber during conditioning. The fluid exiting the chamber may be continuously analyzed (e.g. spectrometrically or by a similar method) in order to dynamically adjust the temperature curve based on the analysis result, thereby optimizing the conditioning process.

It is preferable if a time interval between 15 and 600 seconds, preferably between 30 and 300 seconds, particurlarly preferably between 60 and 240 seconds is between two low points at neighboring times. Typically, the time interval between two neighboring low points is composed of a heating phase and a cooling phase, with active or passive cooling being possible during the cooling phase. The heating phase may account for between 30% and 80%, in particular between 50% and 70%, particurlarly preferably between 55% and 65% of the time interval. It is especially preferable if the heating phase is about 1 to 1.5 minutes, whereas the cooling phase lasts about 1 minute.

In variants, the time interval between two low points at neighboring times may also be shorter than 15 seconds or longer than 600 seconds.

A device for the execution of the process preferably comprises a chamber for admitting the fiber and a heating unit for heating the chamber. The heating unit preferably comprises one or more electrical heating elements within the chamber. The chamber preferably comprises a fluid inlet and fluid outlet, so that the chamber may be flushed with a fluid, in particular a gas. When in operation, the chamber is preferably flushed with an inert gas, in particular with nitrogen or a noble gas. The heating unit may also be designed in such a way that it heats the gas stream, with the fiber able to be heated additionally or alternatively to the heating elements. Alternatively, the fluid inlet and fluid outlet may also be dispensed with. The fluid inlet is preferably positioned in a region of the chamber in which, with the fiber inserted, the tip of the fiber is located so that the fluid may be fed from the fiber tip through the chamber. In this case, the fluid outlet is preferably present, with the fiber inserted, at an end opposite to the tip of the fiber. Alternatively, the fluid inlet and fluid outlet may also be reversed so that the fluid outlet is at the tip of the fiber. Heating may be provided in the form of an electric heating unit, which is regulated at a constant temperature. This allows particularly inexpensive heating to be provided. In variants, the output of the heating unit may be kept constant. The chamber may be designed to be used specifically for conditioning, having an inlet opening for the fiber that is open, i.e. the inlet opening does not contain a septum. This creates a low-maintenance device for conditioning a fiber. Alternatively, an analyzer, in particular a gas chromatograph or liquid chromatograph, may be provided with a heatable injection port for conditioning. The device for carrying out conditioning may optionally include a second chamber that is designed as a cooling chamber and is, for example, maintained at room temperature and flushed with inert gas. The cooling chamber may, however, also be actively cooled, for example to 0° C. or lower.

In the process for conditioning the fiber, the fiber is inserted into the chamber. Either the chamber can already be heated during insertion of the fiber or the chamber is heated after inserting the fiber. After the heating process, the first local maximum of the temperature curve is reached. In a preferred embodiment, the fiber is removed from the chamber after a predefined time interval, for example after 1 minute, to allow it to cool. This allows particularly rapid cooling of the fiber to be achieved while being able to maintain the temperature in the chamber.

The cooling process outside the chamber may take place in a cooling chamber or in the ambient air. To aid the cooling process, a fan may be provided either in the cooling chamber or in the variants in the ambient air. The cooling chamber is at a temperature that is lower than the maximum temperature in the chamber.

Alternatively, the fiber may remain in the chamber during the cooling process, with the heating switched off so that the chamber and hence the fiber are allowed to cool. The cooling process is, however, relatively slow, particularly in the case of heating with electrical heating elements in the chamber. In a further process, the heating unit may also be further operated only at reduced power.

The chamber may in variants also be actively cooled. This is an advantage particularly in the case of chambers or phase materials having a large specific heat capacity and/or mass, since this can accelerate the cooling process. This can be a major advantage particularly in the case of chromatography columns, for example in HPLC or GC. Cooling can take place, for example, with a fluid, in particular with nitrogen or similar for example. If the chamber is intended to be flushed with a fluid, it is possible to increase, for example, just the volume flow rate of the fluid for the cooling process. In addition, the cooling process may also be effected with a cooling element, for example a piezo cooling element or similar. Instead of cooling the chamber directly, it is also possible for just the heating element to be cooled.

In a further variant, the chamber may be heated with a hot gas stream and then cooled with a cool gas stream. In this variant, the chamber is preferably constructed such that the inner wall of the chamber has a lowest possible thermal conductivity/heat capacity.

In an especially preferred process, the fiber is introduced into the preheated chamber and heated. The fiber is then fed out of the chamber to allow it to cool. Cooling preferably takes place outside the chamber, preferably through the room air. It is preferable if this is done by introducing the fiber into a cannula, so that the fiber is not contaminated by the room air during the cooling process. After the cooling process, the fiber is reexposed in the chamber and heated. The chamber is at a constant temperature throughout the process.

The following detailed description and the patent claims in their entirety give rise to further advantageous embodiments and combinations of features of the invention.

BRIEF DESCRIPTION OF THE DRAWINGS

In the drawings which are used to explain the working example.

In principle, identical parts are provided with the same reference signs in the figures.

WAYS OF IMPLEMENTING THE INVENTION

FIGS. 1 to 5 below show various embodiments of a temperature curve. The temperature curves here reflect the temperature of the phase material. The temperature rises in particular are each dependent on a heat output of the chamber and the layer thickness of the phase material, which means that the slope in these regions may be significantly greater, but may also be smaller. Similarly, the slopes in the cooling phases may be greater or smaller, depending on the type of cooling and the layer thickness of the phase material. The temperature curves are intended in particular to also allow a qualitative view of the process, whereas the minimum and maximum temperatures and also the slopes of the temperature curves and the hold times of the temperatures in the temperature curves should not be restricted to the examples.

Figure 1:
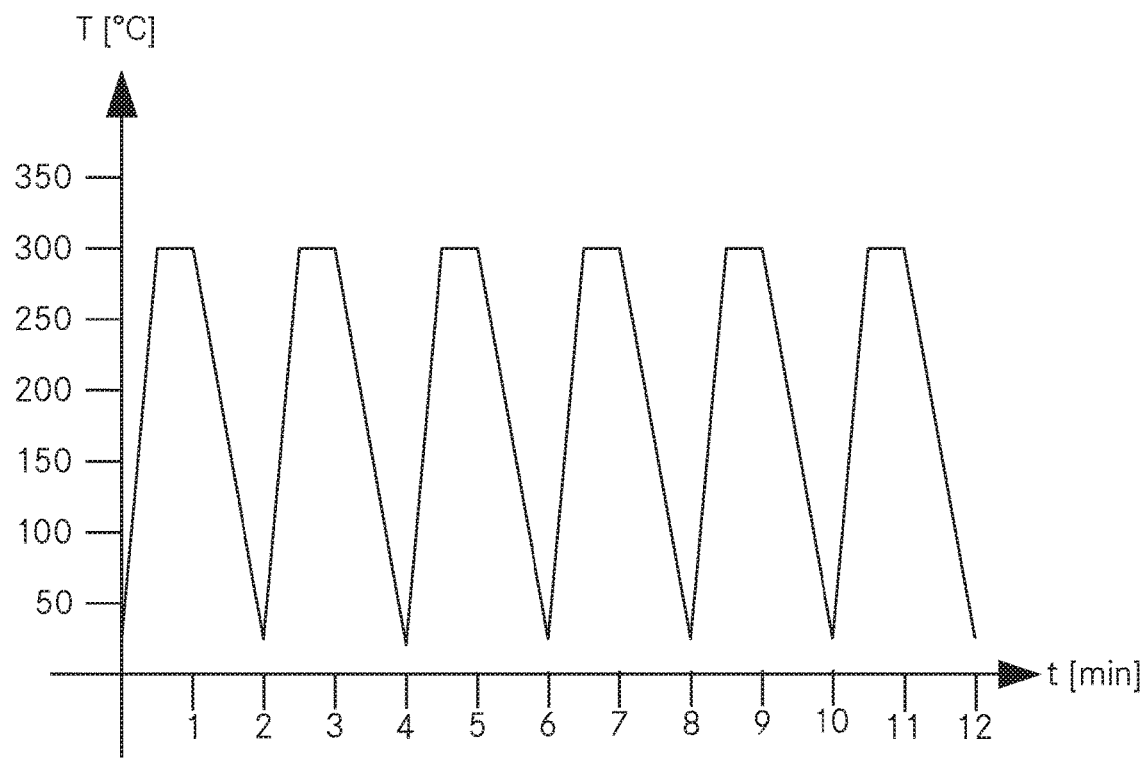
FIG. 1 shows a first embodiment of a temperature curve for the conditioning process.

FIG. 1 shows a first embodiment of a temperature curve for the conditioning process of a phase material in a chamber. The chamber is heated with the heating unit to a constant 300° C. The temperature of the chamber remains constant throughout the conditioning process. At time 0, the fiber is exposed in the chamber and thus heated for 60 seconds. The fiber is then removed from the chamber and allowed to cool in the ambient air. The end temperature after the cooling process is approximately room temperature, in the present case about 25° C. The cooling process lasts 60 seconds. The fiber is then exposed again in the chamber at the temperature of 300° C. for 60 seconds, through which the temperature of the fiber increases from room temperature to 300° C. and is maintained at 300° C. These steps are repeated until the temperature of 300° C. has been reached six times. The process ends after the last cooling process.

In this first embodiment, the temperature curve has five local minima/five low points at a temperature of approximately 25° C. The maximum temperature and the local maxima are each at a temperature of 300° C. The total cycle takes around 12 minutes therewith.

Figure 2:
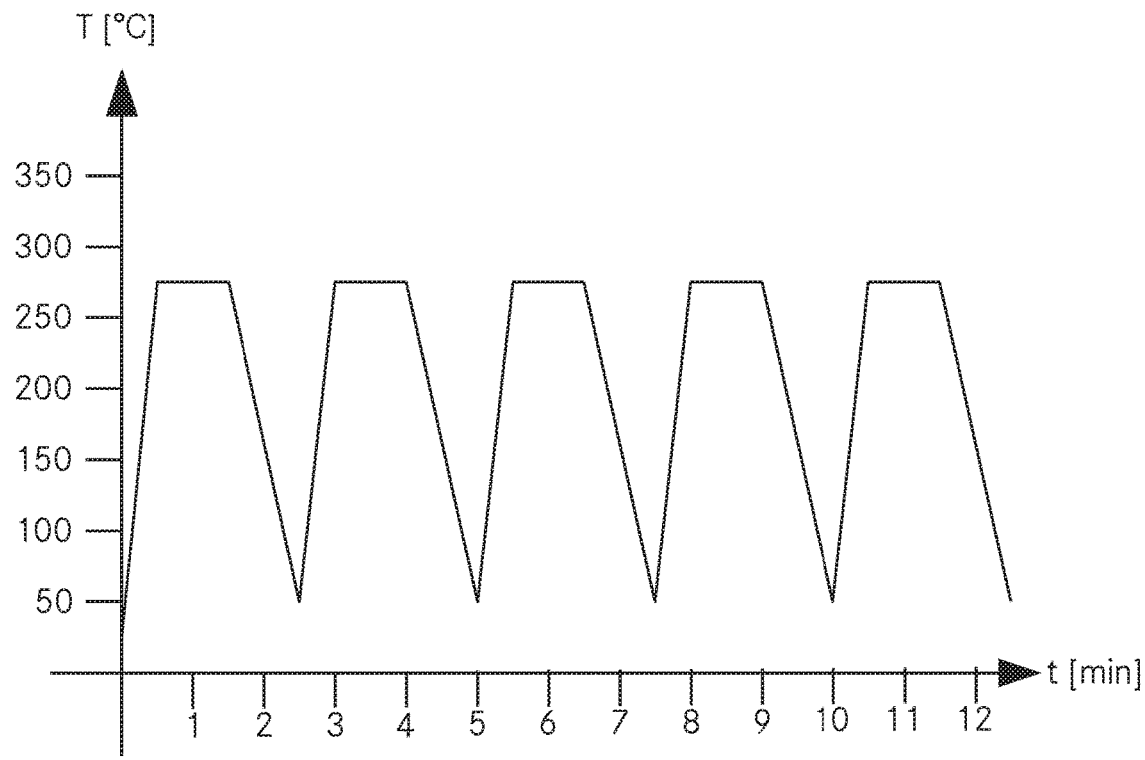
FIG. 2 shows a second embodiment of a temperature curve for the conditioning process.

FIG. 2 shows a second embodiment of a temperature curve for the conditioning process of an adsorbent in a chamber. The chamber is heated with the heating unit to a constant 250° C. The fiber is heated for 90 seconds in the chamber, reaching a maximum temperature of 250° C. The heating unit is then switched off for 60 seconds, whereupon the temperature falls from 250° C. to about 50° C. The heating unit is switched on again, whereupon the temperature rises to 250° C. within 30 seconds and is held for 60 seconds. These steps are repeated until the temperature has been held at 250° C. for 60 seconds five times. The process ends after the cooling process, i.e. at about 50° C.

In this first embodiment, the temperature curve has four local minima/four low points at a temperature of 50° C. The maximum temperature and the local maxima are each at a temperature of 250° C. The total cycle takes around 12.5 minutes therewith. In this second embodiment, the selected maximum temperature is lower than in the first embodiment, but is held for longer. In addition, instead of 6 cycles there is provision only for 5 cycles.

Whereas in the second embodiment the chamber is preferably provided with an electric heating element, it may alternatively also be heated by other means that respond less sluggishly, for example it may be heated with hot gas, microwaves or other means of heating known to those skilled in the art. The cooling process may be effected with cooled gas or with a gas at room temperature. These variants may also be provided in the other exemplary embodiments.

Figure 3:
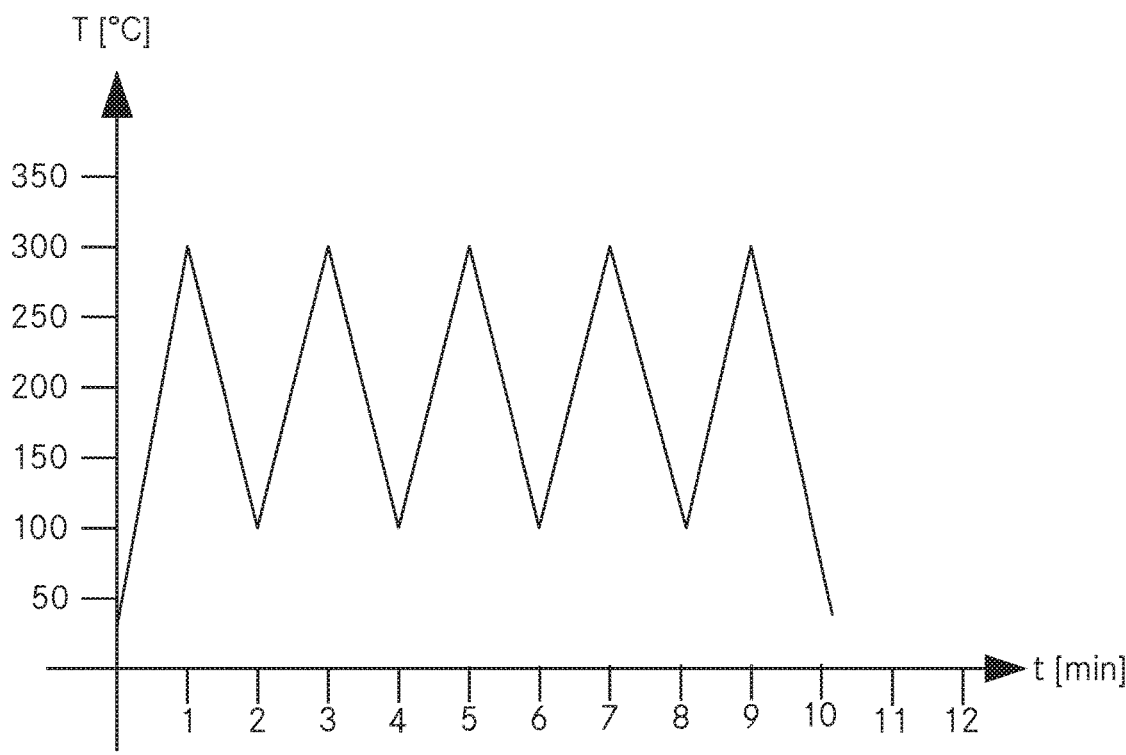
FIG. 3 shows a third embodiment of a temperature curve for the conditioning process.

FIG. 3 shows a third embodiment of a temperature curve for the conditioning process of an adsorbent in a chamber. The starting temperature in the chamber is about 300° C. and remains constant during the process. The fiber is introduced into the chamber and heated to 300° C. for 60 seconds. The fiber is then removed from the chamber and allowed to cool to 100° C. for a further 60 seconds. These steps are repeated until the temperature of 300° C. has been reached five times. The process ends after the last cooling process at room temperature.

In this third embodiment, the temperature curve has four local minima/four low points at a temperature of 100° C. The maximum temperature and the local maxima are each at a temperature of 300° C. The total cycle takes around 10 minutes therewith. In this third embodiment, the selected minimum temperature is higher than in the first embodiment. The maximum temperature of 300° C. is reached only at individual points and is not held for a longer period. There is provision for 5 cycles in the present process.

Figure 4:
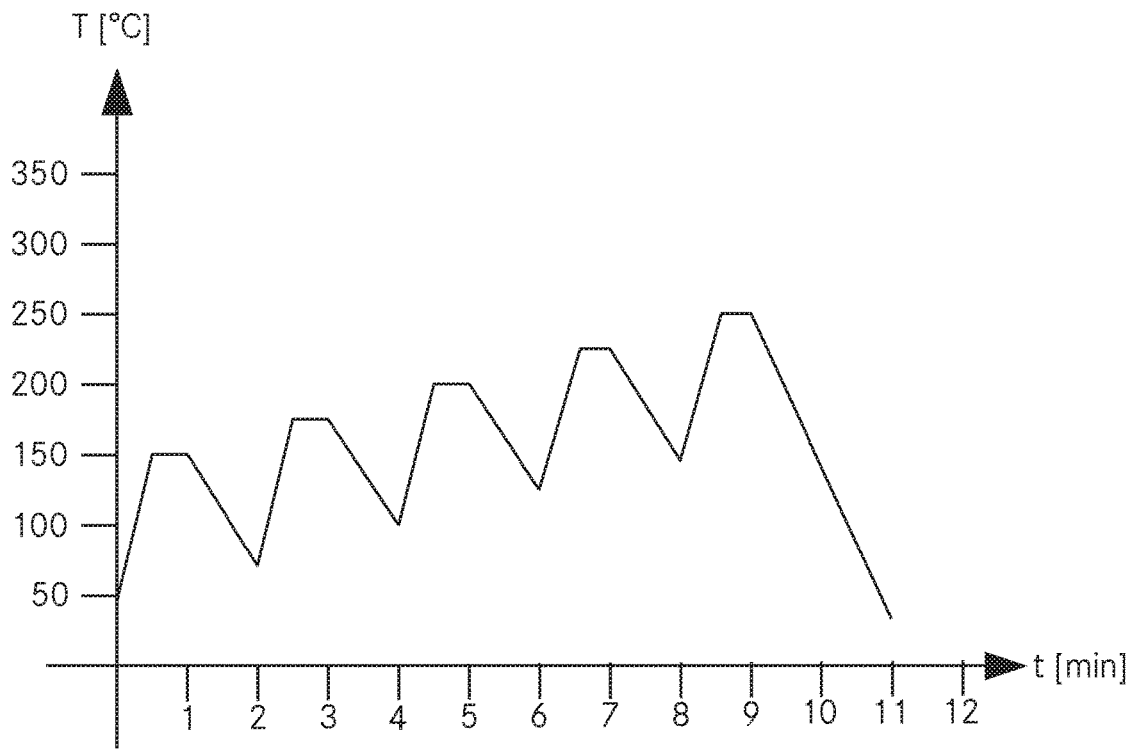
FIG. 4 shows a fourth embodiment of a temperature curve for the conditioning process.

FIG. 4 shows a fourth embodiment of a temperature curve for the conditioning process of an adsorbent in a chamber. The starting temperature in the chamber is about 150° C. The fiber is fed into the chamber for 60 seconds. The fiber is then cooled inside a cannula for 60 seconds in the ambient air to a temperature of about 75° C. During this time, the temperature in the chamber is increased by 25° C. to 175° C. After the cooling process, the fiber is subjected to the temperature of 175° C. in the chamber for 60 seconds. During this process, the fiber is exposed, i.e. it is fed out of the cannula. The fiber is then fed back into the cannula and cooled in the ambient air to a temperature of about 100° C., while the chamber is heated to a temperature of 200° C. These steps are repeated until a low point/local minimum has been reached four times. The process finally ends at room temperature after the last cooling process.

In this fourth embodiment, the temperature curve has four local minima/four low points, which increase successively by a temperature of 25° C. The temperature curve thus shows a trend with positive slope. The maximum temperature is reached after 8 minutes and 30 seconds and is 250° C.

It will be clear to those skilled in the art that the temperature curve may be varied as required without departing from the basic concept of the invention. The trend for the temperature curve shown in the fourth embodiment may also have a different profile, for example with negative slope. In addition, the local minima and local maxima may describe their own functions that deviate from a straight line. The minima and maxima may form a zigzag curve. The minima and maxima of a temperature curve do not need to have a parallel profile, etc.

The individual temperature profiles may in each case be achieved by different chamber heating units and by different cooling techniques. Thus, the second exemplary embodiment of a temperature curve may, for example, also be achieved with an additional cooling chamber, etc.

Figure 5:
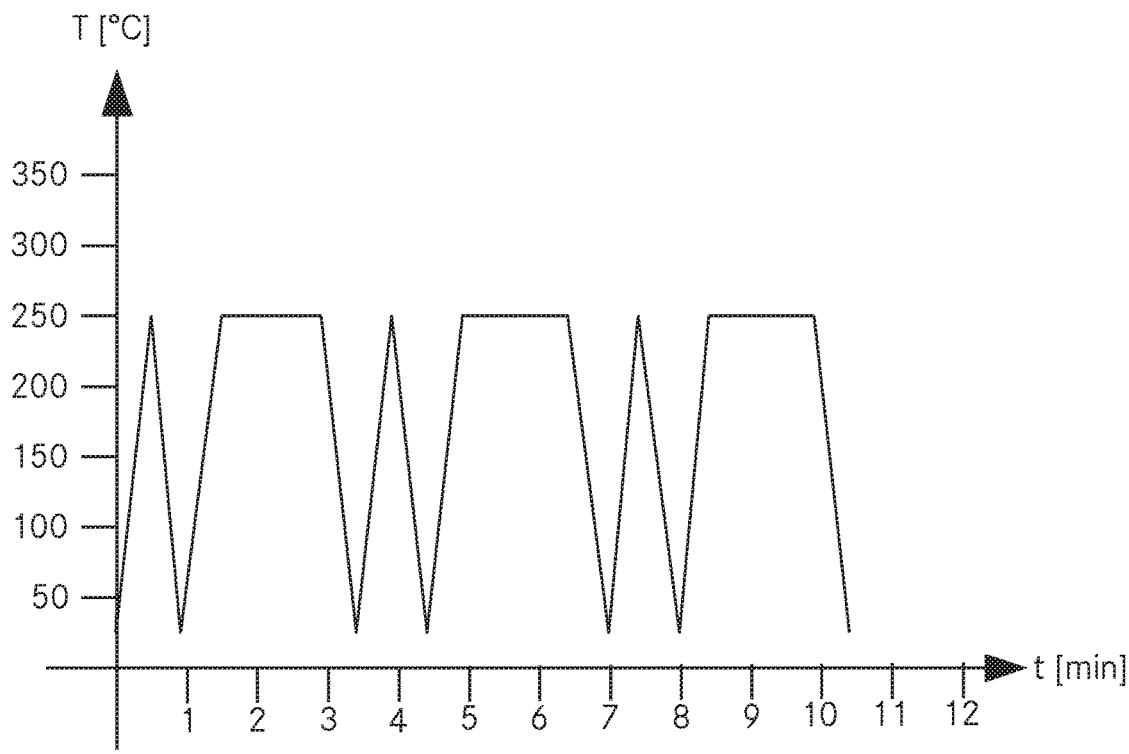
FIG. 5 shows a fourth embodiment of a temperature curve for the conditioning process.

FIG. 5 shows a fifth embodiment of a temperature curve for the conditioning process of an adsorbent in a chamber. The starting temperature in the chamber is about 250° C. and remains constant during the conditioning process. The fiber is fed into the chamber for 30 seconds and heated to a temperature of 250° C. The fiber is then transferred to a separate cooling chamber and cooled to approximately room temperature for 30 seconds. After this, the fiber is returned to the chamber, where it is then subjected to the temperature of 250° C. for 120 seconds. The fiber is then transferred to a separate cooling chamber and cooled to approximately room temperature for 30 seconds. After this, the fiber is returned to the chamber, where it is subjected to the temperature of 250° C. for 30 seconds. These steps are repeated until a low point/local minimum has been reached five times. The process finally ends at room temperature after the last cooling process.

Figure 6:
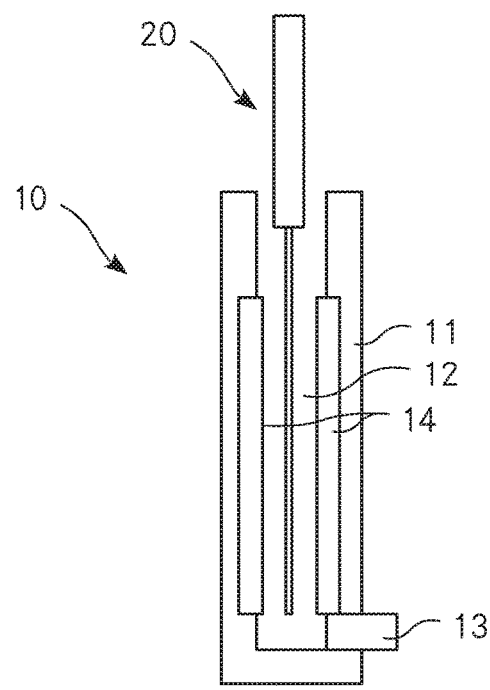
FIG. 6 shows a schematic representation of a device for carrying out conditioning of a fiber for SPME.

FIG. 6 shows a schematic representation of an embodiment of a chamber 10 having a heating unit 14, in which a fiber 20 comprising the phase material is positioned. The chamber 10 comprises a housing 11 with an inner space 12, in which a heating unit 15 is positioned. The heating unit 14 is cylindrical in the present case, in particular is designed as a heating coil into which the fiber 20 may be introduced. The heating unit may alternatively be of a different design, for example the heating unit may be positioned only on one side in the inner space 12 or at the bottom of the inner space 12. The chamber 10 further comprises a fluid inlet 13 in the bottom region of the housing 11 with which a fluid may be fed into the inner space 12. The fluid is used to flush the inner space 12 during conditioning of the fiber. This can avoid an equilibrium being reached between the desorbed analyte and the fiber in the inner space 12. The fluid may be gaseous or liquid. It is particularly preferably an inert gas, for example nitrogen or a noble gas. In addition to, or as an alternative to, flushing the inner space, the fluid may also be used for cooling the fiber, which allows the low points of the temperature curve to be reached more swiftly. Here too, the fluid may be gaseous or liquid. Finally, in addition to, or as an alternative to, cooling or flushing, the fluid may also be used to heat the fiber, which allows the local maxima of the temperature curve to be reached more swiftly, with the fluid again being gaseous or liquid.

The device for carrying out conditioning may be provided in the form of a separate chamber to be used exclusively for conditioning. Alternatively, a heatable injector of an analyzer, in particular a chromatograph, may be provided as a chamber.

The device may further comprise a separate cooling chamber, with the fiber able to be transferred during the process to the cooling chamber for cooling. The cooling chamber may be actively cooled or merely have an inert gas passed through it at room temperature.

Instead of, or in addition to, the cooling chamber, the device may also comprise a fan. The fan may be positioned outside the chamber so that the fiber, in particular the fiber present in the cannula, is positioned outside the chamber in front of the fan for cooling, allowing the fiber to be cooled by the air flow directly or indirectly. However, with the fan it is also possible for a cooling gas (actively cooled or at room temperature) to be passed through the chamber to cool the fiber. In this case, the fiber would not need to be removed from the chamber for the cooling process. In addition, the fan may also be positioned in a separate cooling chamber, thereby allowing a cooled or uncooled gas, in particular an inert gas, to be passed through the cooling chamber to cool the fiber. Those skilled in the art will be aware of further options for cooling the fiber more efficiently or more simply.

Whereas FIG. 6 shows a device for conditioning a fiber, it will be clear to those skilled in the art that other phase materials may likewise be conditioned with the process according to the invention. For example, the process may also be used for conditioning a phase material for SPE.

In addition, the process may also be used for gentle conditioning of HPLC or GC columns. Those skilled in the art will be aware of further possible applications of the process according to the invention.

In summary, it can be stated that the invention provides a particularly gentle process for carrying out conditioning or preparation of a phase material for chemical analysis, in particular for conditioning a fiber for SPME.

The invention claimed is:

1. A process for thermally desorbing a phase material, wherein the phase material is heated along a temperature curve, characterized in that the temperature curve of the phase material during desorption includes at least one low point.

2. The process as claimed in claim 1, wherein a temperature difference between a maximum temperature of the temperature curve and the low point of the temperature curve is between 50° C. and 500° C.

3. The process as claimed in claim 2, wherein the maximum temperature is between 100° C. and 600° C.

4. The process as claimed in claim 2, wherein the low point is between 0° C. and 300° C.

5. The process as claimed in claim 1, wherein the temperature curve includes more than one low point.

6. The process as claimed in claim 3, wherein, between two low points, a high point is in each case reached that is greater than 0.8 times.

7. The process as claimed in claim 1, wherein a time interval between 15 and 600 seconds, preferably between 30 and 300 seconds, particularly preferably between 60 and 240 seconds is between two low points at neighboring times.

8. The process as claimed in claim 1, for conditioning a fiber for carrying out a solid-phase microextraction.

9. The process as claimed in claim 2, wherein a temperature difference between a maximum temperature of the temperature curve and the low point of the temperature curve is between 100° C. and 400° C.

10. The process as claimed in claim 9, wherein a temperature difference between a maximum temperature of the temperature curve and the low point of the temperature curve is between 150° C. and 350° C.

11. The process as claimed in claim 3, wherein the maximum temperature is between 150° C. and 400° C.

12. The process as claimed in claim 11, wherein the maximum temperature is between 200° C. and 300° C.

13. The process as claimed in claim 4, wherein the low point is between 10° C. and 150° C.

14. The process as claimed in claim 13, wherein the low point is between 15° C. and 50° C.

15. The process as claimed in claim 5, wherein the temperature curve includes between 2 and 10 low points.

16. The process as claimed in claim 15, wherein the temperature curve includes between 4 and 8 low points.

17. The process as claimed in claim 6, wherein, between two low points, a high point is in each case reached that is greater than 0.9 times the maximum temperature.

* * * * *